(12) United States Patent
Loussert et al.

(10) Patent No.: US 10,643,773 B2
(45) Date of Patent: May 5, 2020

(54) LINEAR ACTUATOR WITH IMPROVED MAGNETIC STABILITY AND STRIPPING FORCE

(71) Applicant: MOVING MAGNET TECHNOLOGIES (MMT), Besançon (FR)

(72) Inventors: Guillaume Loussert, Besançon (FR); Javier Rios-Quesada, Besançon (FR); Stéphane Biwersi, Frambouhans (FR); Michaël Delbaere, Avanne (FR)

(73) Assignee: Moving Magnet Technologies (MMT), Besancon (FR)

( * ) Notice: Subject to any disclaimer, the term of this patent is extended or adjusted under 35 U.S.C. 154(b) by 88 days.

(21) Appl. No.: 15/767,413

(22) PCT Filed: Oct. 20, 2016

(86) PCT No.: PCT/FR2016/052707
§ 371 (c)(1),
(2) Date: Apr. 11, 2018

(87) PCT Pub. No.: WO2017/068285
PCT Pub. Date: Apr. 27, 2017

(65) Prior Publication Data
US 2018/0301263 A1     Oct. 18, 2018

(30) Foreign Application Priority Data

Oct. 20, 2015     (FR) ...................................... 15 60004

(51) Int. Cl.
*H01F 7/08*     (2006.01)
*H01F 7/16*     (2006.01)
(Continued)

(52) U.S. Cl.
CPC ........... *H01F 7/081* (2013.01); *H01F 7/1615* (2013.01); *H02K 33/16* (2013.01); *H01H 33/6662* (2013.01)

(58) Field of Classification Search
CPC ............................... H01F 7/081; H01F 7/1615
(Continued)

(56) References Cited

U.S. PATENT DOCUMENTS

| 4,195,277 A | 3/1980 | Leicht |
| 4,563,664 A | 1/1986 | Chin et al. |

(Continued)

FOREIGN PATENT DOCUMENTS

| FR | 2308178 A1 | 11/1976 |
| WO | WO-2004/066476 A1 | 8/2004 |
| WO | WO-2014/023326 A1 | 2/2014 |

*Primary Examiner* — Alexander Talpalatski
(74) *Attorney, Agent, or Firm* — Harness, Dickey & Pierce, PLC

(57) ABSTRACT

A linear electromagnetic actuator has a stroke c, with at least one stable position in one of the ends of the stroke, and includes: an armature made of a soft magnetic material, the armature being movable in an axial direction Y and having a length Hm in the direction Y, the armature having a symmetrical shape at the axis Y, and a stationary stator yoke made of a soft magnetic material and holding at least one electric coil. The actuator also includes at least one stationary permanent magnet that is magnetized along a transverse axis X perpendicular to the direction Y. The magnet is transversely placed between the movable armature and the electric coil. The magnet has a length Ha in the direction Y. The stationary yoke and the movable armature define therebetween at least one axial air gap. Ha+c is of the order of magnitude of Hm. The length Hm is such that 0.9×(Ha+c) <Hm<1.1×(Ha+c) so that, when the movable armature is in the end stability position thereof, one of the two axial ends (Continued)

of the movable armature is adjacent to one of the two axial ends of the permanent magnet.

7 Claims, 8 Drawing Sheets

(51) Int. Cl.
*H02K 33/16* (2006.01)
*H01H 33/666* (2006.01)

(58) Field of Classification Search
USPC .................................................. 335/234, 270
See application file for complete search history.

(56) References Cited

U.S. PATENT DOCUMENTS

| | | | |
|---|---|---|---|
| 4,779,582 A | 10/1988 | Lequesne | |
| 4,924,123 A | 5/1990 | Hamajima et al. | |
| 5,444,313 A | 8/1995 | Oudet | |
| 5,559,378 A | 9/1996 | Oudet et al. | |
| 5,942,832 A | 8/1999 | Oudet | |
| 6,028,499 A * | 2/2000 | Oudet | H01F 7/1615 335/220 |
| 6,236,125 B1 | 5/2001 | Oudet et al. | |
| 6,249,065 B1 | 6/2001 | Oudet et al. | |
| 6,313,553 B1 | 11/2001 | Gandel et al. | |
| 7,589,445 B2 | 9/2009 | Gandel et al. | |
| 7,898,122 B2 | 3/2011 | Andrieux et al. | |
| 9,276,454 B2 | 3/2016 | Arlot et al. | |
| 9,714,849 B2 | 7/2017 | Biwersi et al. | |
| 9,935,536 B2 | 4/2018 | Rios-Quesada et al. | |
| 2005/0218727 A1 | 10/2005 | Gandel et al. | |
| 2006/0049701 A1 * | 3/2006 | Sato | F04B 35/04 310/14 |
| 2008/0284261 A1 | 11/2008 | Andrieux et al. | |
| 2014/0150265 A1 | 6/2014 | Arlot et al. | |
| 2014/0203669 A1 | 7/2014 | Rios-Quesada et al. | |
| 2015/0048694 A1 | 2/2015 | Rios-Quesada et al. | |
| 2015/0123651 A1 | 5/2015 | Biwersi et al. | |
| 2016/0086756 A1 * | 3/2016 | Bang | H01F 7/1615 361/160 |
| 2016/0352168 A1 | 12/2016 | Biwersi et al. | |
| 2017/0236630 A1 * | 8/2017 | Kank | H01F 7/081 335/230 |
| 2017/0324284 A1 | 11/2017 | Andrieux et al. | |

* cited by examiner

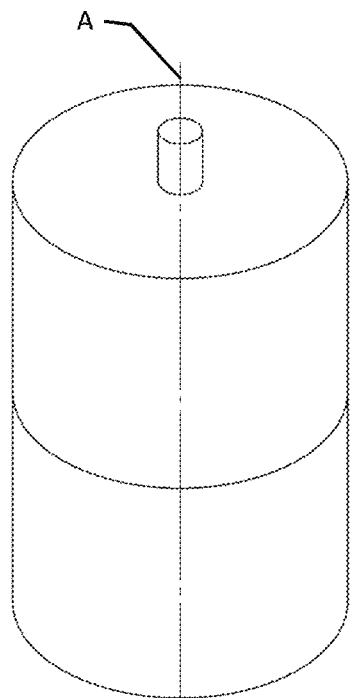
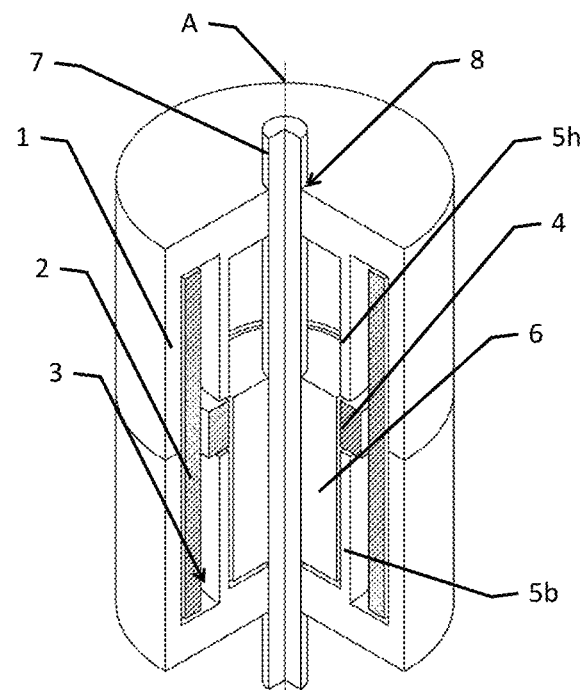
Figure 1a
Figure 1b
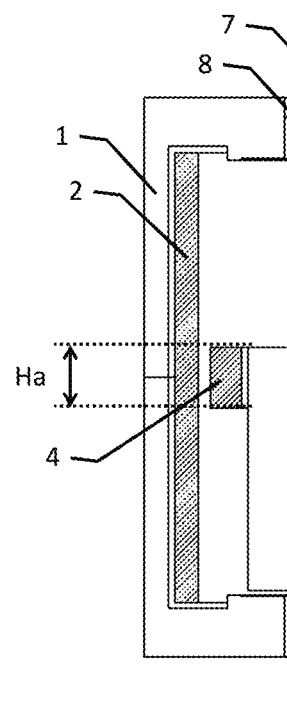
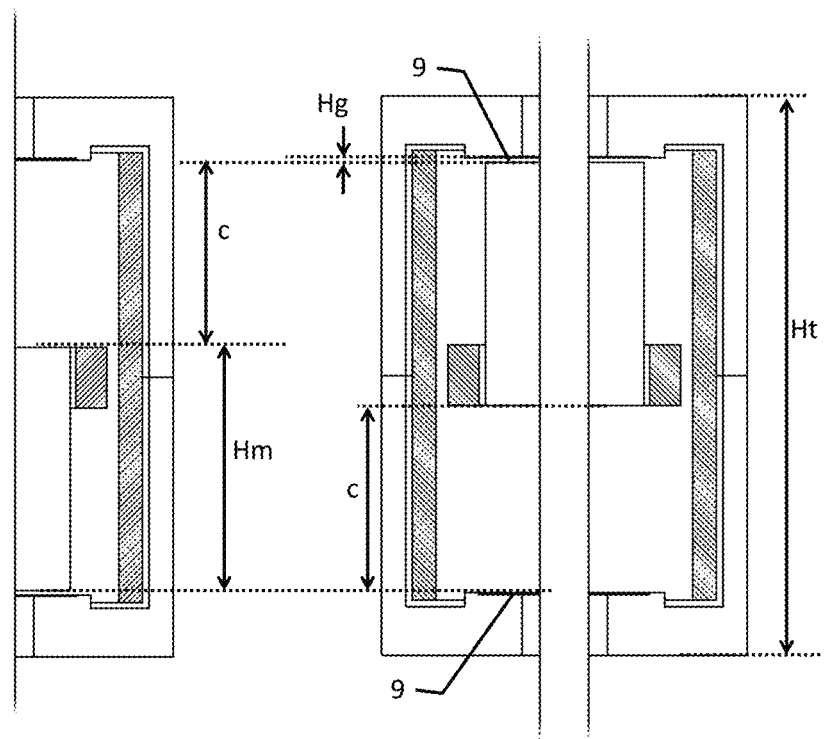
Figure 2a
Figure 2b

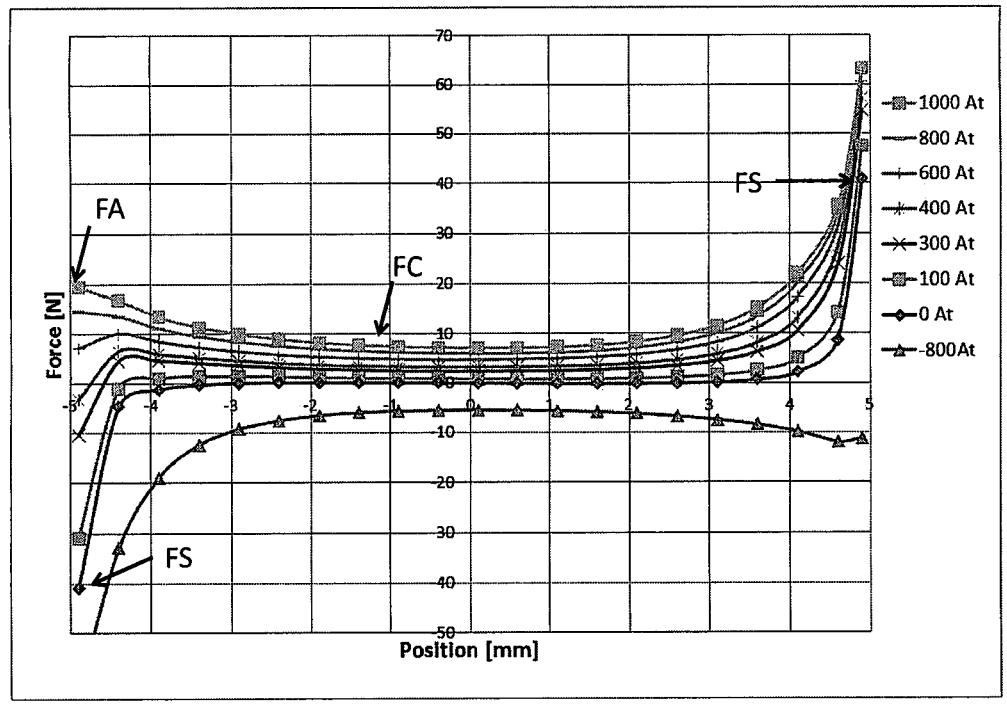
Figure 5
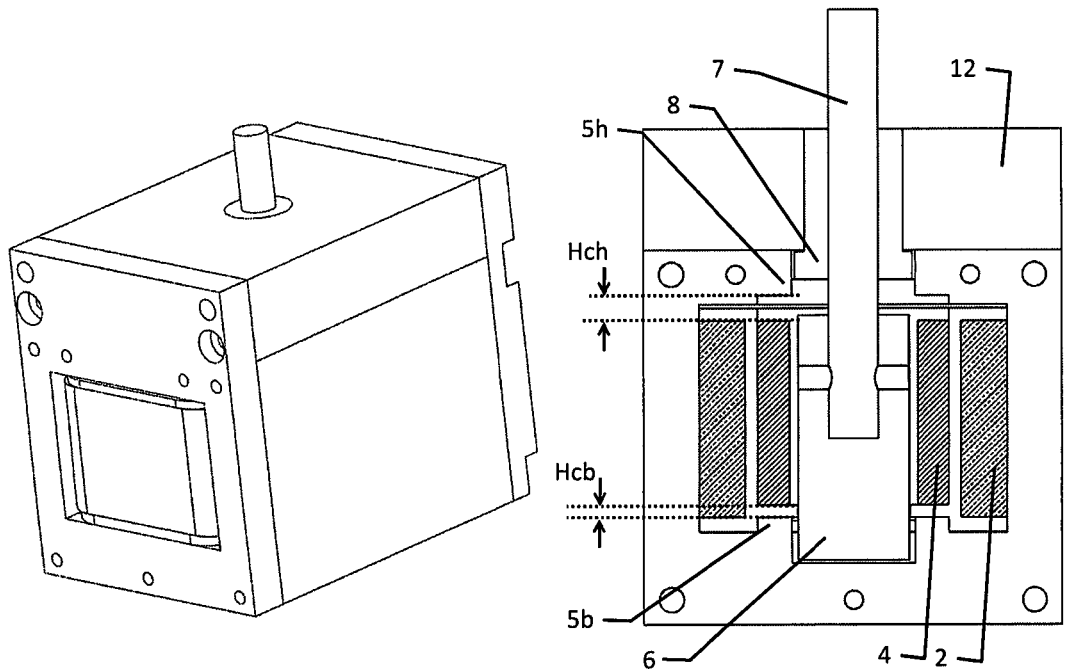
Figure 6a
Figure 6b

LINEAR ACTUATOR WITH IMPROVED MAGNETIC STABILITY AND STRIPPING FORCE

CROSS-REFERENCE TO RELATED APPLICATIONS

This application is a National Phase Entry of International Patent Application No. PCT/FR2016/052707, filed on Oct. 20, 2016, which claims priority to French Patent Application Serial No. 15/60004, filed on Oct. 20, 2015, both of which are incorporated by reference herein.

TECHNICAL FIELD

The invention relates to a linear electromagnetic actuator having one or two stable positions without consumed energy, these stable positions being achieved by means of at least one permanent magnet. More particularly, the invention proposes an actuator having an ability to leave this stable position or positions by means of current, stripping force will be spoken of, and this in a way that is improved compared with the prior art. The invention also proposes an actuator having an ability to make greater linear travels than those permitted with respect to the solutions of the prior art as well as a saving with respect to the magnet mass used for a given stability force.

Non-limitatively and by way of examples, this actuator will find an application for any type of automobile fluid circulation valve, such as for example an actuator for an air inlet or exhaust valve, or for moving a transmission element. Overall, any function requiring the maintaining of one or more stable positions without current, and being able to leave this position by electrical instruction, may find a solution with an actuator as described by the invention.

BACKGROUND

Actuators the stability or stabilities of which are provided by one or more magnets are known in the prior patent art. For example, U.S. Pat. No. 4,779,582 proposes topologies of actuators for moving automobile valves and which in particular use magnets at the fixed (stator) part that actively participate in the maintenance of the two extreme positions of the actuator. These magnets are positioned between two separate electrical coils in order to allow looping of the magnetic flux around the first or second coil. The same type of actuator topology can be found in the document EP 0157632 or more recently in the document WO 2014/023326.

The object of these devices is to solve the general problem of providing mono- or bi-stability without any mechanical aid, such as springs, and this without the consumption of electrical energy by virtue of the use of permanent magnets. However, these devices do not make it possible to provide an easy leaving of the stable positions. This is because springs are used to allow easier leaving, or stripping, of the stable positions. An electric current in the coil, in a privileged air circulation direction, makes it possible to assist stripping but does not completely cancel out the holding force generated by the magnets or does not allow sufficient stripping force to overcome any friction or a load applied to the movable part. In addition, using two separate coils on either side of these magnets in the central position makes the actuator ineffective, half of the total winding not being magnetically active when the movable part is at one end or other of the travel of the actuator.

Another type of mono- or multi-stable actuator making it possible to keep these stability positions by means of the action of a magnet carried by the movable part of the actuator is also known in the document WO 2004/066476. This actuator partly improves the previously mentioned actuators in that the whole of the electrical coil participates in generating a force, whatever the position of the movable part over the travel. In addition, the topology developed makes it possible to generate a stripping force that may be maximised by acting on the embedding of the magnets on the movable part, guided by the mathematical equations disclosed in the document.

On the other hand, this actuator has an original topology that requires an axial space requirement (in the direction of the movement) that may be great, all the more so when the travel required is great. This is because the axial space requirement of the actuator will at a minimum be equal to twice the travel plus what is necessary for installing the electrical coil and the ferromagnetic poles on the stator, as can be appreciated in FIG. 6 of this document. In addition, moving magnets that will undergo high accelerations due to impacts during the arrival of the movable part in the extreme positions, which may in the long term be detrimental to the service life of the system, may possibly be criticised.

Finally, an actuator topology is also known that may have a bistable character where the magnets are fixed in the magnetic structure, requiring only one electrical coil for the functioning in both actuation directions, and where the movable part consists only of a ferromagnetic piece, as described in the applications WO 9427303 or WO 2015/114261. Since these topologies, through their nature, do not benefit from a very high stripping force, summary indications are given to allow an increase in this force by virtue of the use of pole pieces.

Though this type of structure makes it possible to partly settle the aforementioned problems (through the use of a fixed magnet and the use of pole pieces), no precise teaching is given as to the use of the pole pieces. In addition, the dimensional rules given in these documents and particularly the document EP 0713604 make this actuator, as indicated in its preamble, intended for travels of small amplitude, around +/−1 millimetre. There therefore exists a need, not solved by the prior art, relating to the production of an actuator having a travel of several millimetres and being able to range up to typically 15 to 20 millimetres, minimising the magnet mass, favouring a purely magnetic stripping force sufficient to overcome the stable holding force, the friction and any external loads applied to the moving part of the actuator, and favouring a significant actuation force over the travel of the actuator.

SUMMARY

The present invention therefore aims to overcome the drawbacks of the prior art by proposing an actuator having at least one stable position without current and being able to be implemented over travels of several millimetres while benefiting from an improved stripping force and preserving a limited axial space requirement. Another object of the invention is making it possible to reduce the magnet mass compared with the embodiments of the prior art in order to achieve a given stability force. To do this, the present invention proposes firstly, breaking with the teachings of the prior art and the document EP 0713604 particularly, to give very different relative dimensions between the height of the movable mass and the height of the magnet. Because of this, a person skilled in the art would not be led to deviate from the dimensional ratios recommended by this document.

Secondly, the use of pole pieces is cleverly implemented by giving proximity of these pieces to the magnet of the actuator on the one hand and the moving mass in the stable position on the other hand. Thirdly, and just as surprisingly for a person skilled in the art, the use of a fixed magnetic shim to be placed between the magnet and the coil of the actuator, the shim having a height substantially equal to that of the coil, makes it possible to improve the stability forces of the actuator without being detrimental to the stripping force generated by virtue of the electric coil.

More particularly, the invention proposes a linear electromagnetic actuator having a stroke c, at least one stable position in one of the ends of the stroke, and comprising an armature produced from a soft magnetic material, the armature being able to move in an axial direction Y and having a length Hm in the direction Y, and a fixed stator yoke produced from a soft magnetic material and supporting at least one electric coil, said actuator further comprising at least one fixed permanent magnet magnetised on a transverse axis X perpendicular to the direction Y, the magnet being placed transversely between the movable armature and the electric coil, the magnet having a length Ha in the direction Y, the fixed yoke and the movable armature defining between them at least one axial air gap, characterised in that Ha+c is of the same order of magnitude as Hm, the length Hm being such that $0.9 \times (Ha+c) < Hm < 1.1 \times (Ha+c)$. Thus, when the movable armature is in its extreme stability position, one of the two axial ends of the movable armature is in the vicinity of one of the two axial ends of the permanent magnet.

"Stroke" within the meaning of the present patent means the length of the movement along the axis X of the movable armature between two axial stops delimiting the movement of the movable armature. These stops may be mechanical, and fulfil a magnetic function for a bistable actuator, or non-magnetic with one of the stops and magnetic with the other stop, for a monostable actuator.

In order to substantially improve the stripping force and particularly for long strokes of several millimetres, the actuator has two pole pieces secured to the yoke, positioned on either side of the magnet and extending axially towards the magnet over respective heights Hph, Hpb. Advantageously Hpb is close to c and Hpb≥Hph.

In order to economise on the magnet volume while benefiting from improved forces, with regard to both the stripping force and the magnetic stability force, the actuator comprises a shim made from soft ferromagnetic material interposed transversely between the permanent magnet and the electric coil. This ferromagnetic shim has a length in the direction Y that may be close to the length Ha of the permanent magnet but will preferentially have a length close to the height of the electric coil so as to come close to the yoke. Generically, the actuator may have one or two stable positions.

BRIEF DESCRIPTION OF THE DRAWINGS

Other features and advantages of the invention will emerge from the following reading of detailed example embodiments, with reference to the accompanying figures, which show respectively:

FIGS. 1a and 1b, respectively a view in full perspective and a truncated view of a bistable actuator according to a typical embodiment similar to the second embodiment;

FIGS. 2a and 2b, two views along an axial cutting plane of a bistable actuator according to the invention in a first embodiment, respectively in each of the stroke end positions;

FIG. 5, a graph showing the typical force generated by a bistable actuator according to the invention over a given linear stroke;

FIGS. 6a and 6b, two views according to respectively a perspective and an axial cutting plane of a monostable actuator according to the invention;

DETAILED DESCRIPTION

Figure 3:
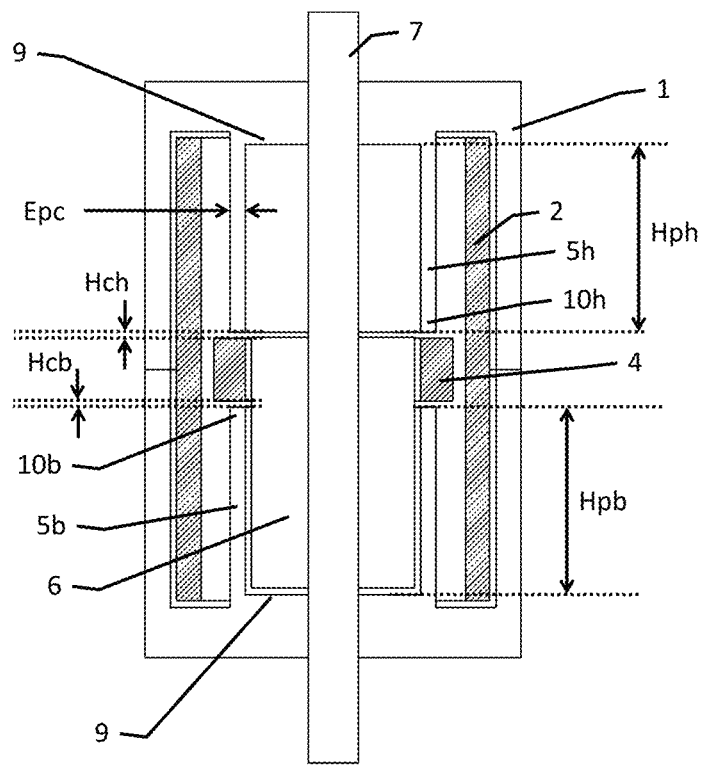
FIG. 3, a view along an axial cutting plane of a bistable actuator according to the invention in a second embodiment.

FIG. 1a presents a perspective view of an actuator according to a particular embodiment of the invention. In a general embodiment, the preferred form has axisymmetry about the axis (A) and the actuator has a tubular shape. The invention is however not limited to an embodiment in this axisymmetric form since an embodiment in a parallelepipidal form is also possible as shown in FIGS. 6a and 6b. Likewise, though, in the Figures, the yoke (1) appears to be produced in two parts, this is merely a non-limitative example embodiment of the way of producing this external yoke (1).

The truncated view in FIG. 1b, where a quarter of the actuator has been omitted in order better to appreciate the embodiment detail, has all the constituent elements of the actuator in a preferred embodiment. There is therefore found at the stator, grouping together the fixed parts of the actuator, a yoke (1) made from a soft ferromagnetic material, this yoke having here a cylindrical external shape, an electric coil (2) housed in a cavity (3) formed in the yoke (1), and a permanent magnet (4) positioned axially at the centre of the yoke (1). It may be envisaged positioning the magnet not at the centre but axially offset in order to favour asymmetry of functioning of the actuator in one direction of movement or the other. In this preferred embodiment, the yoke (1) is extended axially, inside the volume defined by the electric coil (2), by pole pieces (5b, 5h) which come in the vicinity of the magnet (4). The part able to move in translation in the axial direction relative to the stator is composed of a tubular armature (6) made from soft ferromagnetic material that moves inside the volume defined by the magnet (4) and the pole pieces (5b, 5h). This armature (6) is secured to a shaft (7) that slides in a bearing (8) secured to the yoke (1) and serves to secure an external member (not visible) to be moved by the actuator.

The use of the pole pieces (5b, 5h) is not primarily necessary for the general invention, as will be found in the views in FIGS. 2a and 2b. This is because, in this first embodiment of a bistable actuator thus presented in these views, the dimensions given at the various elements constituting the actuator, conferring on it the possibility of making linear strokes greater than what is possible with the embodiments of the prior art, are especially appreciated. Thus in denoting the axial height of the magnet (4) Ha, the axial height of the movable armature (6) Hm, the stroke of the actuator c, the fact that Hm is such that Hm=Ha+c can be appreciated. This general dimensional rule, which can be appreciated even when equality is not strictly respected, makes it possible to produce an actuator having a stroke c much greater than Ha. And the height Ht of the actuator is thus scarcely greater than 2×c+Ha, that is to say by adding the thickness of the axial stops (9) formed in a soft ferromagnetic material secured to the yoke (1). One consequence of this sizing is the fact that, axially, the ends of the magnet (4) are aligned with, or in the vicinity of, the ends of the armature (6) when the latter is in its extreme positions. It is a feature that is taken advantage of in the second embodiment in FIG. 3.

It should be noted that the armature (6) can either come into contact with these axial stops (9) or come into contact with external stops (not shown) or come into contact on a non-magnetic element (not shown) interposed between the stops (9) and the armature (6). Advantageously permitting the existence of a residual air gap of axial height Hg, the advantage of which can be assessed in FIG. 5, is in fact also part of the subject matter of the invention. This is because a residual air gap will make it possible to be positioned at a point on the stroke where the stripping force and the magnetic stability force are optimised according to the necessities of a given specification.

Figure 11:
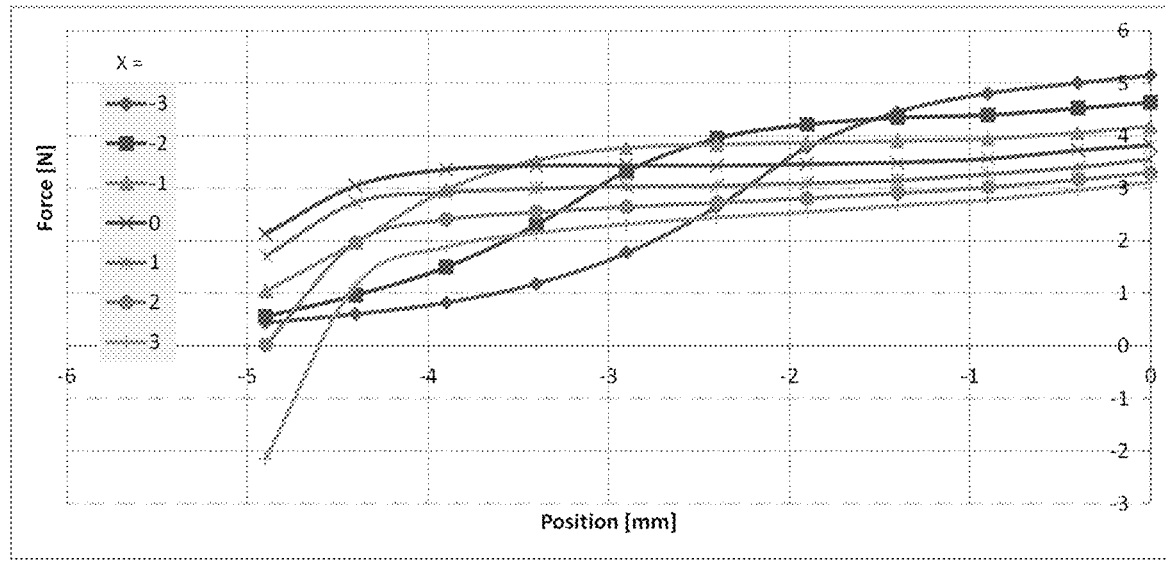
FIG. 11 a graph showing the importance of the relationship between magnet height, the stroke and the height of the movable armature.

FIG. 11 makes it possible to appreciate the important character of the relationship Hm=Ha+c. This is because the graph depicted shows the change in the factor x such that x=Hm−(Ha+c). The optimum stripping force close to the position −5 mm, in this example, is clearly visible when x=0, and a significant fall in this optimum is observed when x becomes strictly negative or positive. It has been observed that, generally according to the cases considered, the optimum stripping force is observed when Hm is such that 0.9×(Ha+c)<Hm<1.1×(Ha+c). On moving away from this range, the reduction in the stripping force proves to be significant.

FIG. 3 presents a second embodiment, similar to the preferred embodiment presented in FIG. 1, where the elements in FIGS. 2a and 2b are found as well as the pole pieces (5b, 5h) described in FIG. 1b. These pole pieces (5b, 5h) are here disposed symmetrically, axially, with respect to the mid-plane of the actuator perpendicular to the axis of the actuator. These pole pieces (5b, 5h) have a thickness Epc, constant in the example embodiment described here, the value of which makes it possible to optimise the force curve. The pole pieces (5h, 5b) extend axially, over a height, respectively Hph, Hpb, so that their ends (10h, 10b) are close to the magnet. In doing this, there also exists, in each of the two stability positions of this actuator, proximity between one of the ends (10a, 10b) and one of the ends of the armature (6). The distances Hch and Hcb that exist between the axial ends (10h, 10b) of the pole pieces (5b, 5h) and the axial ends of the magnet (4) may be equal if it is wished to confer symmetrical behaviour on the actuator, that is to say its ability to have the same type of force response when actuation is carried out from one of the stroke ends towards the other or vice versa. It is possible to give different values between Hcb and Hch if it is wished to confer an asymmetric character on the actuator (different force response between one movement direction and the other) or if it is wished to produce a monostable actuator, for example as described in FIGS. 6a and 6b. Finally, it is possible to integrate only one of these two pole pieces, and to produce pole pieces that extend not over 360° but over a smaller angle when the yoke (1) is axisymmetric. The latter modification makes it possible in particular to adjust as required the forces generated.

The use of the pole pieces (5b, 5h) will be particularly sought if the stripping force requirement is high, which is in particular the case as the stroke of the actuator increases. This is because, through an effect of magnetic synergy between the armature (6) and the two pole pieces (5b, 5h), a high stripping force is generated and the mechanical work that is produced overall on the stroke increases significantly.

For all the embodiments using these pole pieces (5b, 5h), it is important to keep the values Hch and Hcb relatively low with respect to the stroke c. We explain here the functioning of these pole pieces (5b, 5h) in the case of the example in FIG. 3, where the armature (6) is in its lower stability position. Under the action of the electric current, the magnetic flux created by the coil (2) will pass through the lower pole piece (5b) and pass through the armature (6) so that, during the whole of the movement over the stroke, the height Hph, Hpb being close to the stroke c, this passage of magnetic flux will be preserved. The thickness Epc that is relatively fine compared with the radial thickness of the armature (6) will ensure that the magnetic flux does indeed pass through the armature rather than returning too quickly to the yoke (1). The lower pole piece (5b) will therefore advantageously have to be such that Hpb is substantially equal to c, that is to say Hcb has a small value compared with c or Hm. The upper pole piece (5h) will fulfil an attraction role assisting the stripping of the stability position through an effect of local variable reluctance between the armature (6) and the upper pole piece (5h). In order to adjust this stripping force, it will be possible to follow for example the influence of Hch on the force curve as presented in FIG. 9. The thickness Epc is also given so that the stripping force and then the force on the stroke are sculpted in accordance with the given specification. To do this, the teachings of FIG. 10 will be able to be used as a general guide.

Generically, it is therefore necessary for:
- the pole piece (5b) facing the armature (6) in its magnetic stability position to be such that Hcb is small compared with c or Hm, that is to say Hpb close to c,
- the pole piece (5b) opposite to the armature (6) to be such that Hcb≤Hch, an increase in Hch making it possible to confer a force trend sculpted so as to favour for example the use of a residual air gap Hg in order to adjust the magnetic stability force, the stripping force and the force on the stroke,
- the thicknesses of the pole pieces to be small and not necessarily constant with respect to the radial thickness of the armature (6).

Figure 7:
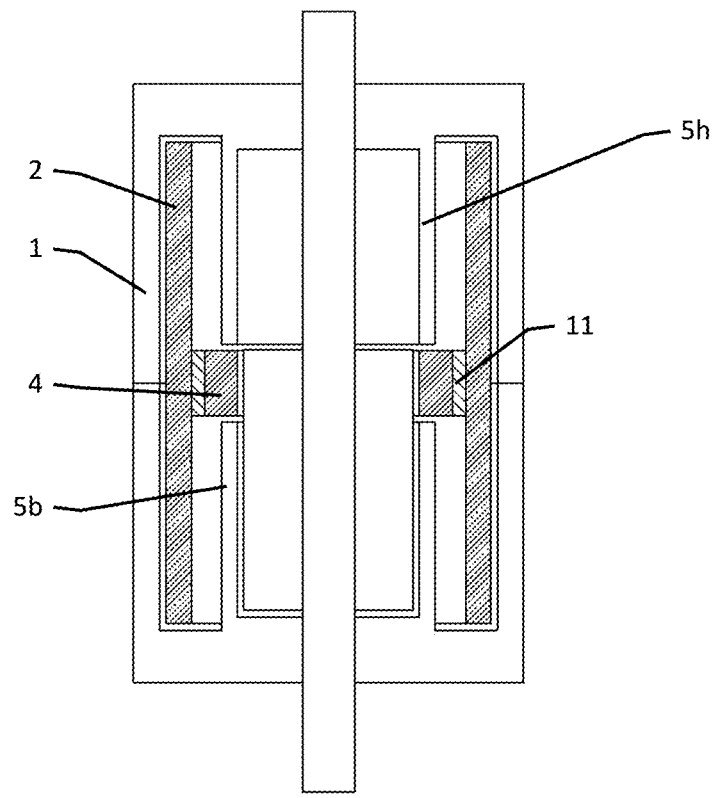
FIG. 7, a view along an axial cutting plane of a bistable actuator according to the invention in a fourth embodiment.

In order to improve the magnetic stability force without current, it may be advantageous to position a magnetic shim (11), made from soft ferromagnetic material, radially positioned between the magnet (4) and the coil (2). This shim (11) may have an axial height similar to that of the magnet (4), as illustrated in FIG. 7, or preferentially a height similar to that of the coil, so as to favour passage of the magnetic flux between the magnet (4) and the yoke (1), as presented in FIG. 4. In order not to favour an excessive magnetic permeance of the coil (2), and thus short-circuit part of the useful flux between magnet (4) and coil (2), it is advantageous to optimise the thickness of the shim (11) by favouring its magnetic saturation.

Figure 4:
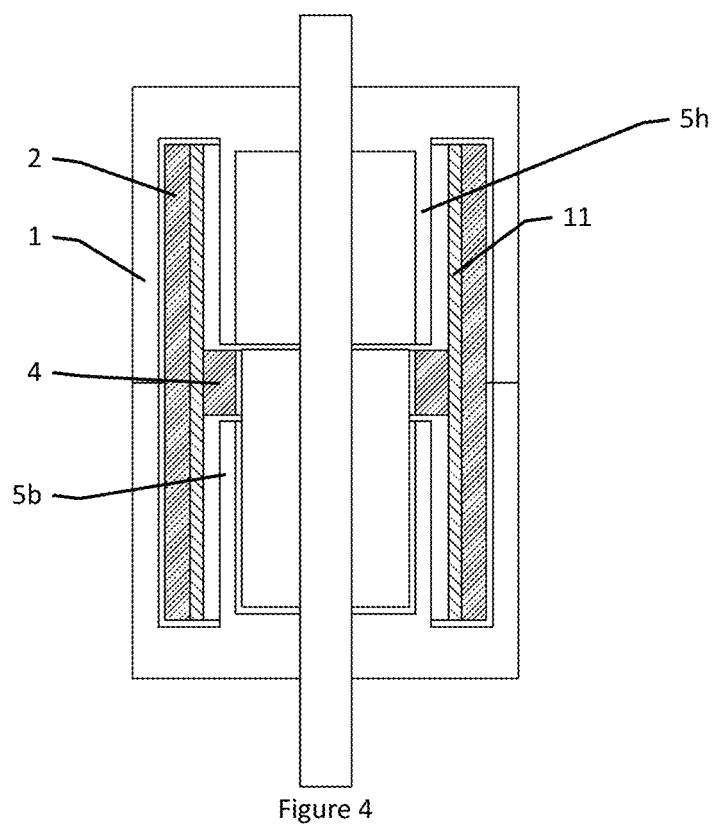
FIG. 4, a view along an axial cutting plane of a bistable actuator according to the invention in a third embodiment.
Figure 13:
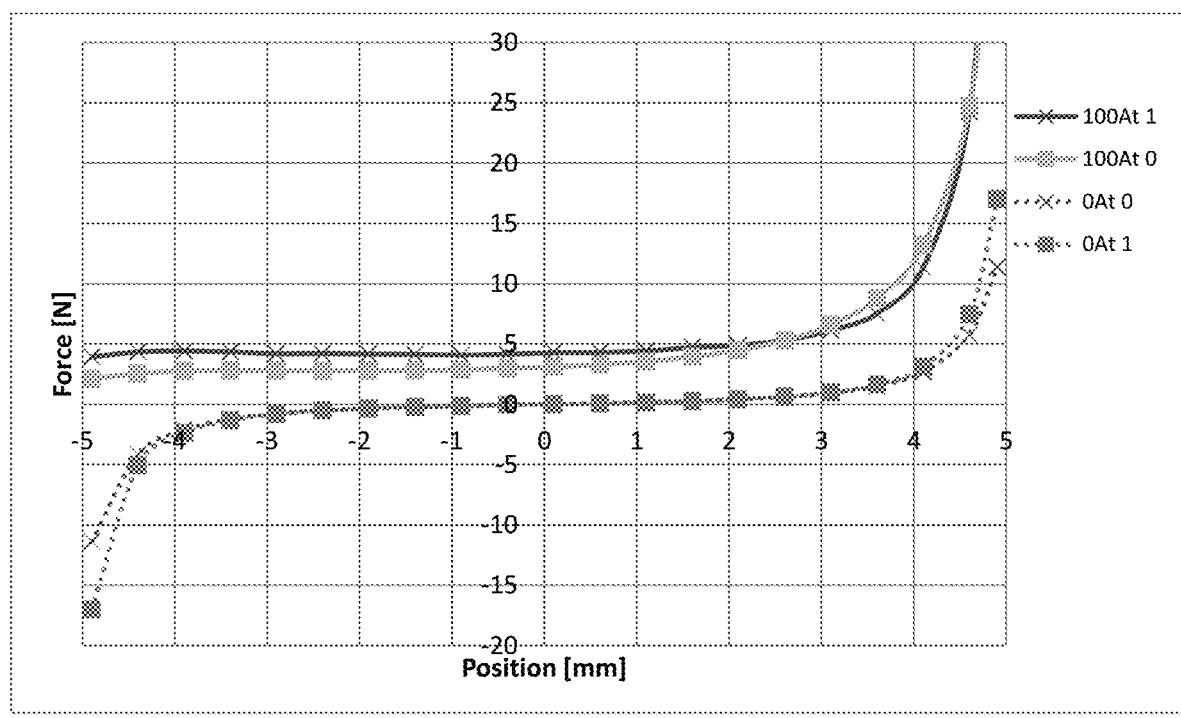
FIG. 13 a graph showing the advantage of an implementation according to the third embodiment of FIG. 4.
Figure 14:
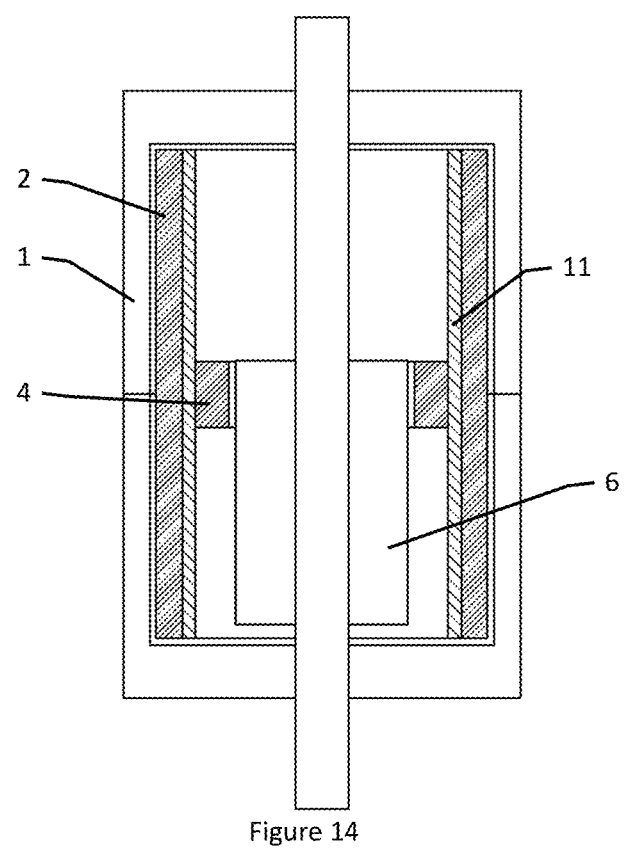
FIG. 14 an alternative embodiment that uses magnetic shims as a pole piece.

This shim (11) makes it possible to reduce the thickness of the magnet (4) while keeping identical mechanical properties (force generated with and without current). In the end, it is possible to obtain an actuator having the same total volume and the same volume of electric coil (2), either by considering a magnet (4) of a given transverse thickness, or by considering a magnet (4) and a shim (11) having, together, an equivalent transverse thickness. A saving on the volume of magnet may thus optionally be achieved. This advantageous and surprising property is illustrated by FIG. 13, where the change in the force curves with and without current (respectively 0 At and 100 At) can be seen for two different actuators not having a shim or having a shim behind the magnet (respectively cases "0" and "1"). For case "0", the magnet (4) has a thickness of 2.5 mm and in case "1" the magnet (4) has a thickness of 2 mm and the shim a thickness of 0.5 mm, that is to say a total thickness similar to that of case "0". Whether it be with or without current, the stripping and magnetic stability forces are improved (reinforced effect) for case "1" relative to case "0" whereas the magnet mass has been reduced. It will be necessary, according to the sizing in question and the magnetomotive forces present and the cross-section of the magnetic circuit, to adjust the relative thickness of the shim (11) and magnet (4) in order to benefit from the optimum of this effect. This shim (11) may be used in conjunction with the pole pieces (5h, 5b) as illustrated in FIGS. 4 and 7 or without pole pieces as illustrated in FIG. 14.

Figure 12:
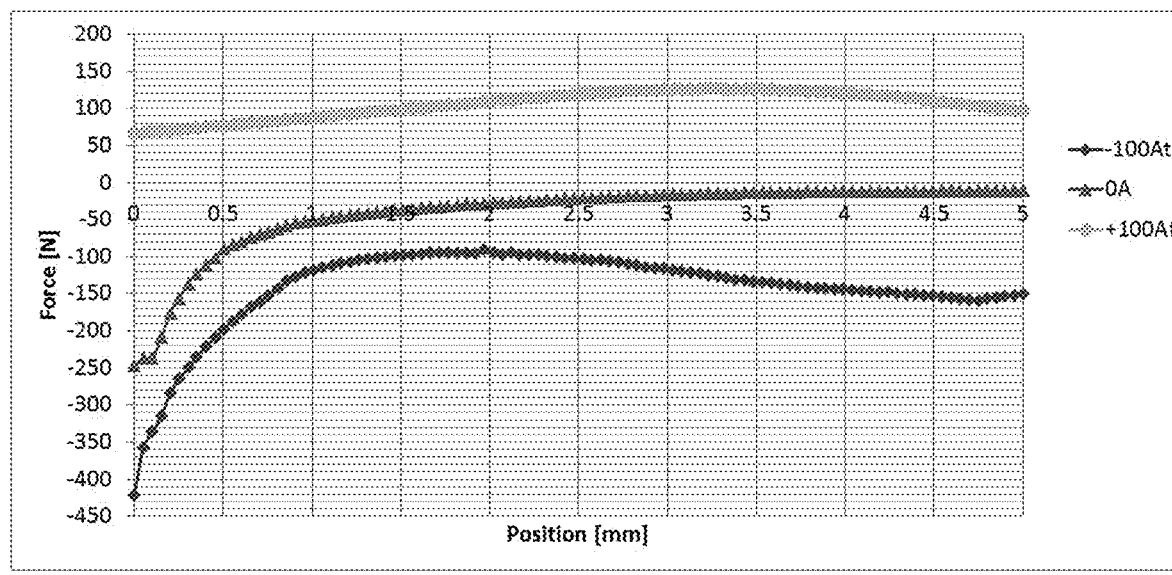
FIG. 12 a graph showing the typical change in the forces for an actuator having asymmetry as presented in FIGS. 6a and 6b.

A parallelepipidal embodiment of a monostable actuator is presented in FIGS. 6a and 6b. The notable features are here the asymmetry of the actuator, which does not have an identical force response in both actuation directions, by virtue of a particular work on the pole pieces (5b, 5h). On the lower part, the distance Hcb is minimised in order to favour the proximity between the magnet (4) and the lower pole piece (5b), in accordance with the teachings presented in FIG. 3. The distance Hch is greater than the distance Hcb in order to obtain a force with current that increases after the stripping force, as explained in FIG. 10. This actuator also has a non-magnetic stop that also serves as a bearing (8), on the upper part of the actuator, so that the armature (6) comes into abutment on this element and that there is no stability force when the armature (6) is in the high position. The support of this stop (8) is here represented by a non-magnetic plate (12). The return to the low position may be achieved either by action of the current in the coil (2), or gravity, or any external load. FIG. 12 illustrates the typical behaviour of such an actuator in the direction of the current applied, where it can be seen that the force curve at +100 At is not symmetrical with that at −100 At and that the curve without current applied does not have symmetry with respect to the centre of the stroke.

Figure 8:
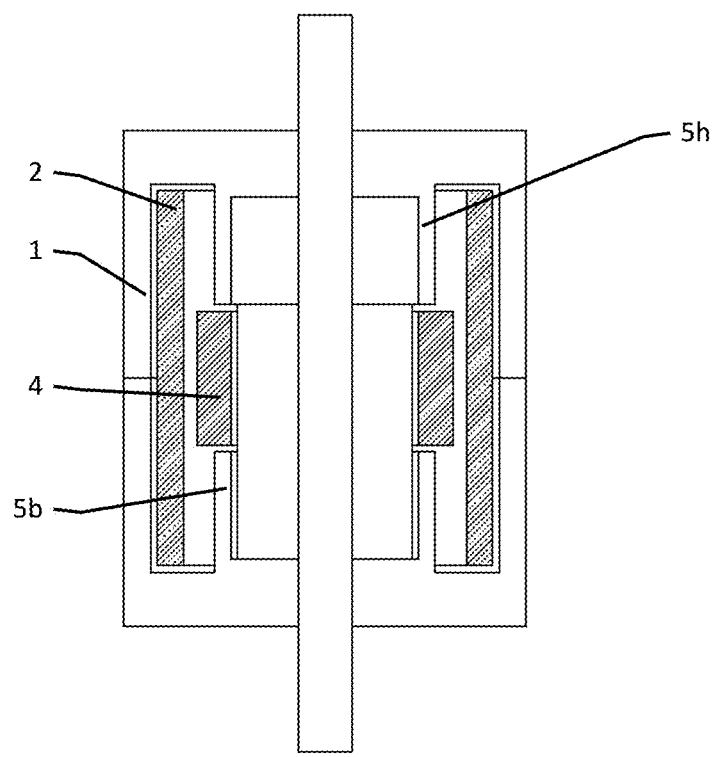
FIG. 8, a view along an axial cutting plane of a bistable actuator according to the invention in an alternative embodiment.

In general terms, the stripping force and the force on the stroke will be improved by increasing the height (Ha) of the magnet. For example, FIG. 8 presents such an embodiment, where the forces with current will be improved compared with the embodiment in FIG. 3 but where the stroke c will be reduced if it is wished to keep a similar height Ht. This increase in the magnet mass is however not essential to the correct functioning of the actuator, and allowing viable functioning with a height Ha substantially less than the travel c and less than the height Hm of the armature (6) forms part of the object of the invention.

Figure 9:
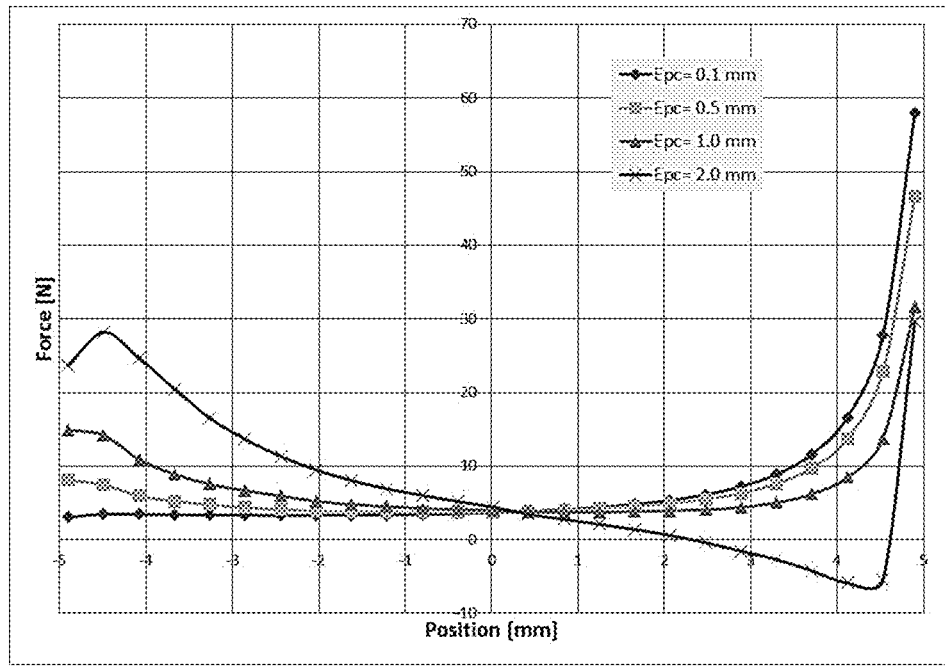
FIG. 9, a graph showing the influence of the thickness of the pole pieces.
Figure 10:
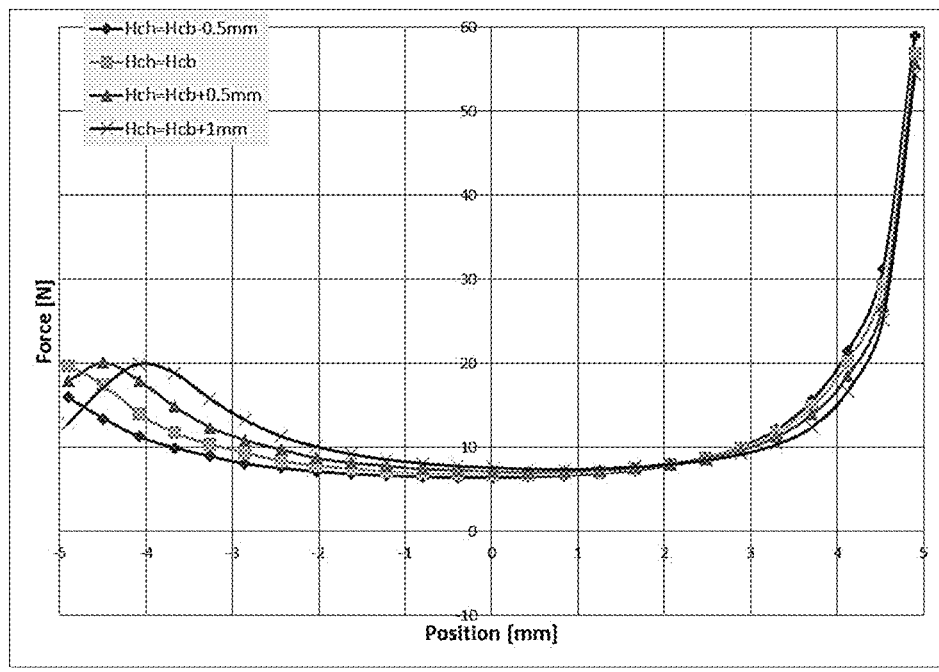
FIG. 10 a graph showing the influence of the heights of pole pieces.

FIGS. 5, 9 and 10 present, through examples, the advantages and general teachings conferred by an actuator that is the subject matter of the invention. In FIG. 5, we present, in the context of a bistable actuator, the change in the force over the stroke of the actuator as a function of the number of ampere-turns circulating in the coil (2) when the dimensional criteria in FIG. 3 are respected and the pole pieces (5b, 5h) are used. Here we take the case Hcb=hcb=0.5 mm, and Ha+c=Hm, with Ha=10 mm, for a stroke c of +/−5 mm, that is to say 10 mm. On this graph, FS denotes the magnetic stability force, symmetrical on both sides, FA denotes the stripping force, making it possible to leave the stable position with a non-negligible force, FC denotes the force on the stroke, possibly necessary if the actuator is to overcome a load (friction, reaction force, force of a gas, etc.) over the entire stroke. The thickness of the pole pieces is around 1 to 1.5 mm, that is to say small compared with the width of the armature (6). It will be noted that the direction of the current is of course important since a positive current results in an overall positive force allowing stripping, according to the level injected, when the armature is in position −5 mm, whereas a negative current will reinforce the stability force in this same position. On the other hand, when in position +5 mm, it is the negative current that will make it possible to leave the stability position.

FIG. 9 in this regard gives information with regard to the sizing of the thickness Epc. As explained above, the thickness must remain optimised according to the specification determined. It can be seen, in this example similar to the case of the example in FIG. 5, that an excessive increase in the value Epc certainly leads to maximisation of the stripping force but also to a very great reduction in the force over the second part of the stroke, the force even passing into negative values, so that actuation, in the case of high external loads, is not ensured. It will thus be necessary to optimise the value of Epc while remaining low in relation to the stroke and especially also to the cross-sections of the magnetic materials present. Use of a non-constant Epc thickness will make it possible to achieve advantageous compromises by acting on the magnetic saturation according to the position.

FIG. 10 for its part gives indications as to the value of Hch to be given in order to obtain optimum performance according to the specification in the case where Hcb=0.5 mm and Hm=Ha+c+0.5 so that the end of the armature (6) is aligned axially with the end of the pole piece (5h) when Hch=Hcb.

This study case corresponds to a case similar to the cases presented in FIGS. 5 to 9 but we see here that the increase in Hch relative to Hcb makes it possible to shift the stripping force and force on the stroke curves. If it is wished to privilege the stripping force, a value of around Hch=Hcb will have to be privileged. If it is wished to benefit from a force increasing at the start of the stroke, it will be necessary to privilege a height Hch greater than Hcb, that is to say to create an axial offset between the end of the attraction pole piece and the end of the armature (6). It should be noted that the variations in Hch and Hcb have only a negligible effect on the stability force so that these parameters can be optimised independently of each other.

The invention claimed is:

1. A linear electromagnetic actuator comprising:
a stroke c, at least one stable position in one of the ends of the stroke;

an armature produced from a soft magnetic material, the armature being able to move in an axial direction Y and having a length Hm in the direction Y, the armature having a form symmetrical to the direction Y;

a fixed stator yoke produced from a soft magnetic material and supporting at least one electric coil;

the actuator further comprising at least one fixed permanent magnet magnetised on a transverse axis X perpendicular to the direction Y;

the magnet being placed transversely between the movable armature and the electric coil, the magnet having a length Ha in the direction Y;

the fixed yoke and the movable armature defining between them at least one axial air gap;

Ha+c is of the same order of magnitude as Hm, the length Hm being such that $0.9 \times (Ha+c) < Hm < 1.1 \times (Ha+c)$; and two pole pieces integral with the yoke, positioned on either side of the magnet and extending axially towards the magnet over respective heights Hph, Hpb.

2. An electromagnetic actuator according to claim 1, wherein Hpb is similar to c and Hpb≥Hph.

3. An electromagnetic actuator according to claim 1, further comprising a shim made from soft ferromagnetic material interposed transversely between the permanent magnet and the electric coil.

4. An electromagnetic actuator according to claim 3, wherein the ferromagnetic shim has a length in the direction Y similar to the length Ha of the permanent magnet.

5. An electromagnetic actuator according to claim 3, wherein the ferromagnetic shim has a length along the direction Y similar to the length of the electric coil and in the vicinity of the yoke.

6. An electromagnetic actuator according to claim 1, wherein the actuator has two stable positions.

7. An electromagnetic actuator according to claim 1, wherein the actuator has a single stable position.

* * * * *